(12) United States Patent
Brambrink et al.

(10) Patent No.: US 8,747,988 B2
(45) Date of Patent: Jun. 10, 2014

(54) GLUED COMPOSITE PLASTIC PART, METHOD FOR THE PRODUCTION THEREOF, AND PART MADE THEREFROM

(75) Inventors: Roland Brambrink, Ratingen (DE); Ulrich Grosser, Kurten (DE); Florian Dorin, Cologne (DE)

(73) Assignee: Bayer MaterialScience AG, Leverkusen (DE)

( * ) Notice: Subject to any disclaimer, the term of this patent is extended or adjusted under 35 U.S.C. 154(b) by 380 days.

(21) Appl. No.: 13/132,156

(22) PCT Filed: Nov. 26, 2009

(86) PCT No.: PCT/EP2009/008454
§ 371 (c)(1),
(2), (4) Date: Jun. 1, 2011

(87) PCT Pub. No.: WO2010/063413
PCT Pub. Date: Jun. 10, 2010

(65) Prior Publication Data
US 2011/0236641 A1    Sep. 29, 2011

(30) Foreign Application Priority Data
Dec. 4, 2008    (EP) .................................... 08021081

(51) Int. Cl.
*B29C 45/00*    (2006.01)
*B32B 3/06*    (2006.01)
*B32B 3/08*    (2006.01)

(52) U.S. Cl.
USPC ............................. 428/119; 428/98; 428/120

(58) Field of Classification Search
USPC ........................................ 428/119, 98, 120
See application file for complete search history.

(56) References Cited

U.S. PATENT DOCUMENTS

| | | | |
|---|---|---|---|
| 4,881,773 A | 11/1989 | Ichinose | |
| 5,190,803 A | 3/1993 | Goldbach et al. | |
| 5,842,265 A | 12/1998 | Rink | |
| 6,244,653 B1 * | 6/2001 | Nishio et al. | 296/216.09 |
| 6,517,150 B2 | 2/2003 | De Gaillard et al. | |
| 6,680,017 B1 | 1/2004 | Koch et al. | |
| 7,037,568 B1 * | 5/2006 | Rogers et al. | 428/119 |
| 2004/0194281 A1 | 10/2004 | Endemann et al. | |

FOREIGN PATENT DOCUMENTS

| | | |
|---|---|---|
| CA | 2394790 A1 | 5/2001 |
| EP | 0285974 A2 | 10/1988 |
| EP | 0489320 A1 | 6/1992 |
| EP | 0547664 A2 | 6/1993 |
| EP | 1488958 A1 | 12/2004 |
| WO | 9703855 | 2/1997 |

* cited by examiner

*Primary Examiner* — Brent O'Hern
(74) *Attorney, Agent, or Firm* — John E. Mrozinski, Jr.

(57) ABSTRACT

The invention relates to a composite plastic part consisting of a plastic part (1) that has a rib structure (2), and (a) profiled support(s) (4) which is/are glued to the ribs and the longitudinal edge of which is arranged vertically or nearly vertically on the plastic base. The invention further relates to a method for producing such a composite part and finished products containing such composite parts as components.

11 Claims, 8 Drawing Sheets

Figure 1:
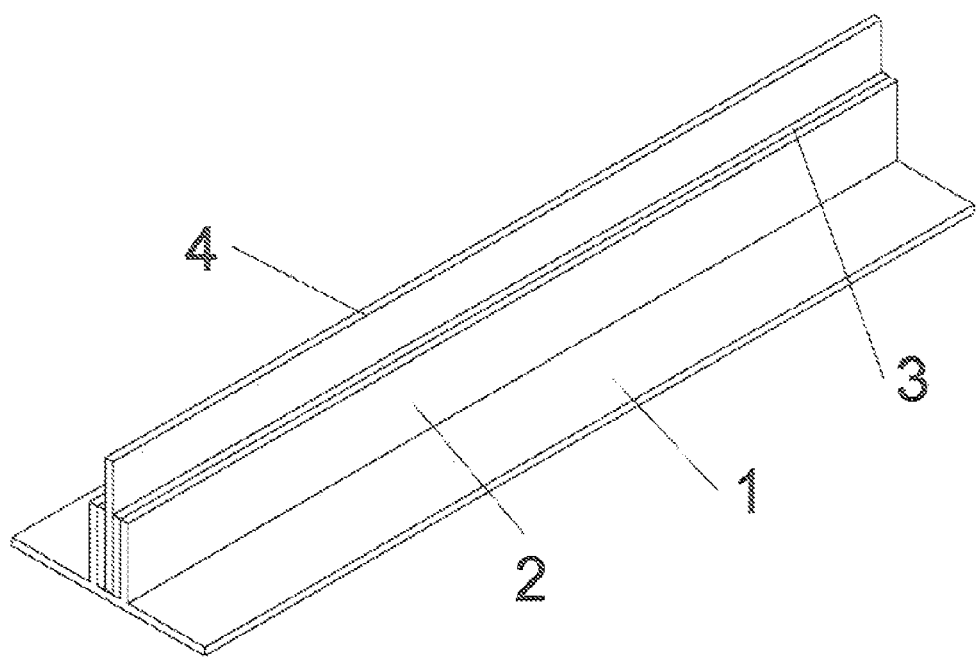

GLUED COMPOSITE PLASTIC PART, METHOD FOR THE PRODUCTION THEREOF, AND PART MADE THEREFROM

The present invention relates to a composite plastics structural member consisting of a plastics structural member containing a rib structure and support profile(s) which is/are adhesively bonded to the ribs and a narrow side of which is positioned on the plastics base body. The invention relates further to a method for the production of such a composite structural member and to finished parts containing such composite structural members as components.

A method for the production of a composite structural member comprising a metal structural member and a plastics structure is known from DE-A 101 49 633, in which the metal structural member, which has at least one surface having at least one punched rim or punched collar, and the plastics structure are pressed together with the aid of one or more joining tools, the punched rim/collar penetrating into or through the plastics structure in a positively and non-positively locking manner.

Known composite structural members or semi-finished products consist, for example, of laminar composites in which, for example, two metal sheets are joined with the aid of an intermediate plastics material or plastics foam to form a sandwich structure (see EP 489 320 A1, EP 285 974 A1 and EP 547 664 A2). In addition, there are methods for producing composite sheets having metal sheets on the outside and a rib structure on the inside (see EP 775 573 A2). Furthermore, there is a method for joining metal sheets by a combination of pressing and injection moulding in a tool (EP 721 831 A1). Moreover, plastics/metal composite structural members are also known in which metal sheets are supported by rib structures (EP 370 342 A2). In EP 1 235 675 A1, composite plastics structural members are described in which two flat workpieces of different materials are joined together in their edge region by means of integrally moulded plastics material.

In the prior art described above, the metal structural member, which in most cases is a metal sheet, is joined to the plastics material in a positively locking manner at discrete points or over larger areas, whereby maximum rigidity of the system as a whole is to be ensured. To that end, even in the case of adhesive bonding or welding, the structural members are bonded together as firmly as possible in order to avoid flexibilities at the joint and to achieve maximum load transmission of the two material pairs by means of a connection that is as rigid as possible. This procedure is disadvantageous under the action of heat, however, because in most cases materials having different thermal expansion coefficients are connected and this accordingly leads to distortion of the composite as a whole. Consequently, internal stresses occur, resulting in a deterioration of the properties of the plastics structural member, which manifests itself, for example, in stress cracks, and/or in failure of the structural member as a whole. Methods which are said to counteract this effect of distortion are described, in WO 1997/003855, EP 1 174 299A2 and U.S. Pat. No. 4,881,773.

U.S. Pat. No. 7,037,568 B1 describes joining members which are to perform the function of joining a foil skin, for example of aluminium, to a supporting rib structure. One face of the joining member is thereby adhesively bonded to the skin; on the opposite side, one side of the rib is adhesively bonded in an indentation in the joining member. The described rib structure here serves as a supporting base for a skin to which it is joined via a third member—the joining member. The materials of the individual members are so chosen that different thermal expansions do not occur. An important element of the disclosed structural members is also that the rib is in each case located at both its upper side and its lower side in a joining member, which joins it to the surrounding skin. Only in that manner is it possible to perform an effective support function.

DE 19842456 A1 describes a method of avoiding sink marks on the visible side of a (large-area) plastics structural member. This is achieved with the aid of a rib applied by 2-component injection moulding. Connection with a support profile is not provided.

EP 1 488 958 A1 describes a method of joining structural members of plastics material and metal, for decorative purposes. The use of the metal parts as support profiles as disclosed in the present invention is not described, however.

Movable opening roof systems, whether they be produced from glass or from plastics material, are additionally reinforced in order to satisfy rigidity or strength demands. In the case of known sliding glass roofs, large-area profiled metal sheets are adhesively bonded beneath the sliding roof. The profiled metal sheets have been produced beforehand by pressing and/or deep-drawing. If the roof systems are transparent, a see-through region, must subsequently be cut out of the metal sheet. This produces a large amount of waste. In order to reinforce the sliding roof system, the profiled metal sheet is so shaped that cavities are formed to increase the geometrical moment of inertia. Owing to the large area of the sheet metal body that is used, the system is heavy.

The object underlying the present invention is to provide a plastics composite in whose production or use no stress or load peaks occur in the plastics structural member. The occurrence of internal stresses, which can lead to distortion of the structural member and/or failure of the material, is to be avoided so that even amorphous thermoplastics and plastics materials that are susceptible to stress cracking can be used. The reinforced composite plastics structural members, are to have as low a weight as possible, as a result of the efficient use of materials, and are to be inexpensive to produce using a method that is as simple as possible. At the same time, in particular in the case of "class A" surfaces, the reinforcing structure is not to cause visible faults on the plastics structural member, as can arise in the case of sheet metal inserts in injection moulding.

The plastics composite reinforced in the novel manner is to be suitable for use in, automotive glazing, in particular for large panoramic roof systems or movable opening roof systems, having the above-mentioned properties.

It is a further object of the invention to provide methods for the production of the plastics composite reinforced in the novel manner.

Surprisingly, it has been possible to achieve those objects by the present invention, in which local stress peaks are avoided by combining the specific geometry of the reinforcing structure and the use of structural adhesives as a compensation layer for isolating the plastics material from the metal.

The invention provides a composite plastics structural member comprising a plastics structural member K containing a flat plastics base body G and additionally, on at least one side, also a rib structure R which comprises at least one rib or at least one pair of ribs and which is joined by means of at least one rib face, by adhesive technology, to at least, one profile face of a support profile S in such a manner that the narrow side of the support profile is positioned on the plastics base body or at a slight distance above the plastics base body.

The invention further provides a method for the production of such a composite structural member, as well as finished parts containing such composite structural members as components.

Figure 4A:
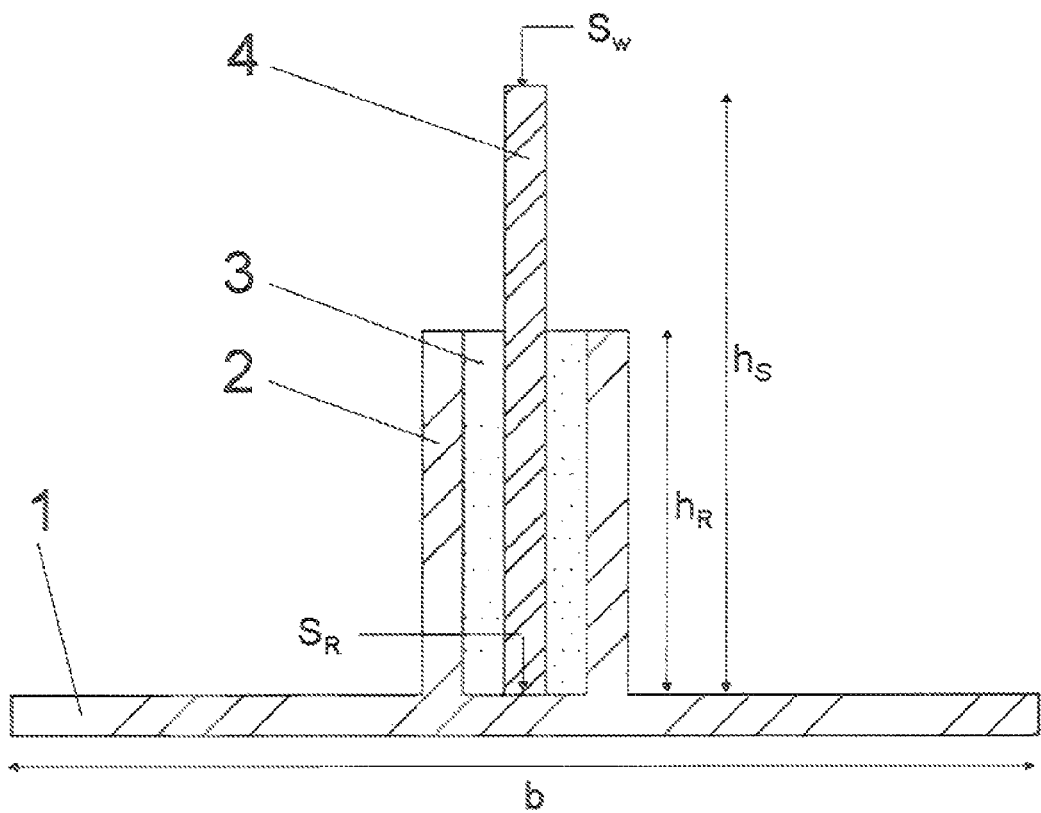
Figure 4B:
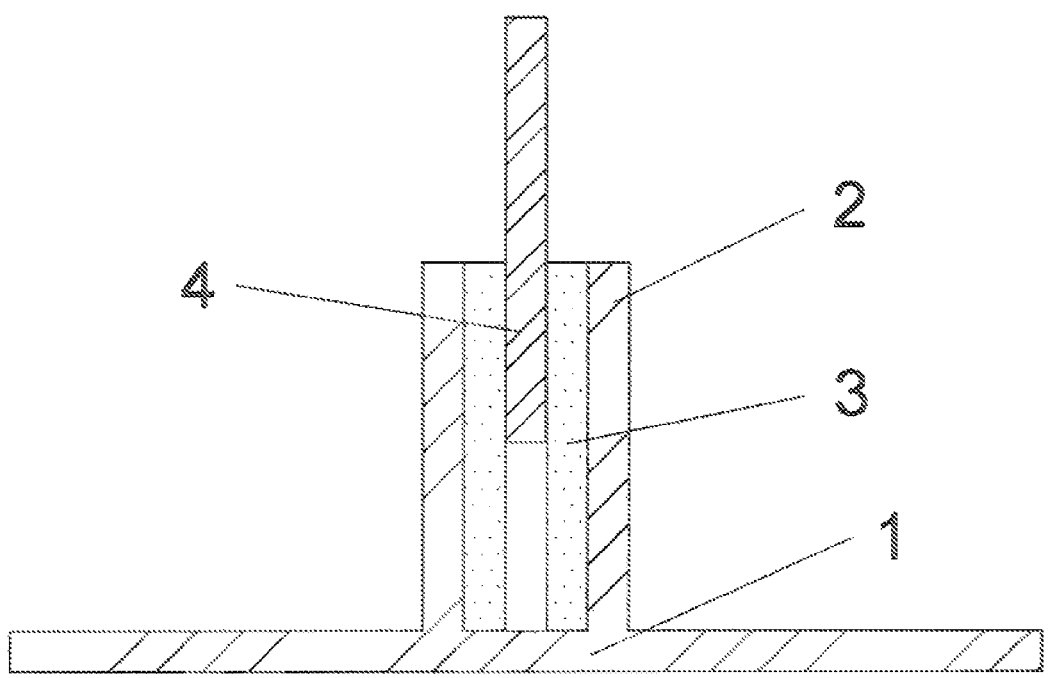

Within the scope of the invention, "is positioned on the plastics base body" means that a narrow side face of the profile is parallel to the surface of the plastics base body, either positioned directly thereon or positioned at a slight distance from the base body, as is shown by way of example in FIG. 4a (positioned directly thereon) and FIG. 4b (at a slight distance) for the use of an I-shaped profile.

A pair of ribs within the scope of the invention consists of two ribs running next to one another, it being possible for the ribs to run parallel to one another or at a variable distance from one another. The same is true of the ribs of a rib package within the scope of the invention, which consists of one or more ribs. Associated ribs of a pair of ribs, like all the ribs of the rib structure (R), can have the same or different heights. If the rib structure R consists of a plurality of rib packages, the number and arrangement of the rib packages is advantageously governed by the extent and nature of the demands that are expected to be made of the finished part and by the nature and height of the support profile that is to be adhesively bonded therein. In a particularly preferred embodiment, the rib packets are so arranged that the load on the reinforcing structure as a whole is distributed and the adhesive is loaded over as great a length as possible, preferably via shear.

In preferred embodiments, two or more ribs are arranged parallel to one another; in other preferred embodiments, two or more ribs run concavely or convexly relative to one another in sections.

In a further preferred embodiment, the ribs have guide or support ribs and/or further guide on holding elements for simplifying the mounting of the support profile(S).

The base body (G) and the rib structure (R) of the plastics structural member (K) are preferably produced by the injection moulding process or the extrusion process and can consist of the same material or of different materials. Suitable materials are thermoplastic plastics. There are suitable in particular an unreinforced, reinforced and/or filled plastics material based on polyamide (PA), polyesters, in particular polyethylene terephthalate (PET), polybutylene terephthalate (PBT), polyacrylates, in particular polymethyl methacrylate (PMMA), polybutylene terephthalate (PBT), polystyrene (PS), syndiotactic polystyrene, acrylonitrile-butadiene-styrene (ABS), polyolefin, in particular polypropylene (PP), polyethylene (PE), polycarbonate (PC), copolycarbonate (CoPC), copolyester carbonate, or a mixture of these plastics materials. In a preferred embodiment, the plastics materials are amorphous thermoplastic plastics, in particular polycarbonate, copolycarbonate, copolyester carbonate, PC blends and polymethyl methacrylate.

The plastics structural members K are in particular fixedly bonded or alternatively movable motor vehicle roof modules, such as, for example, panoramic roofs having a surface area of preferably from 0.5 m² to 1.5 m², which have a width b (FIG. 4a). The width b in the case of a roof module is at least 0.2 m, preferably greater than 0.4 m. Such roof modules are preferably produced by injection moulding processes. Similar systems having surface areas greater than 0.5 m², preferably greater than 1 m², can also be used as architectural glazing. Such glazing is preferably produced by extrusion.

Figure 7:
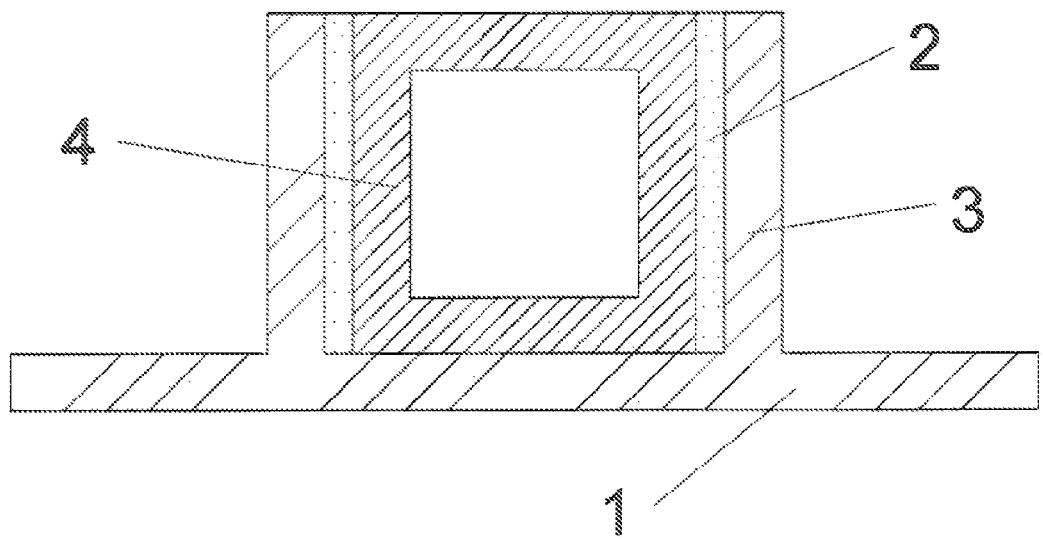

The support profile S inserted into the rib structure can be in one part or in a plurality of parts. It can be either solid or produced with cavities, channels or the like. In the most simple and a preferred embodiment, the support profile is an I-shaped profile, an L-shaped profile or a T-shaped profile. Also possible is a U-shaped profile, which, for example, also joins pairs of ribs. It can be a closed profile, for example a rectangular tube. In that case, the geometries of the narrow and wide side faces can be identical (See. FIG. 7). With appropriate geometry, the support profile can contain, for example, one or more channels which can be used to accommodate cables and hoses or to carry fluids or gases.

In FIG. 4a, the dimensions of the composite structural member are shown in an exemplary embodiment. The reference numerals and letters used have the following meanings:
1 plastics base body (G)
2 rib, part of the rib structure (R)
3 adhesive layer
4 support profile (S)
$h_S$ height of the support profile
$h_R$ height of the rib
$S_W$ side face of the profile that faces away from the plastics base body
$S_R$ side face of the support profile that faces the plastics base body
b width of the plastics base body The support profile can correspond to the ribs in terms of the geometry of its surfaces, so that the inserted profile has the same height (FIG. 4a, $h_S$) as the ribs (FIG. 4a, $h_R$). However, it can also be lower or higher than the ribs, so that it may protrude beyond the rib or from the rib package. The height $h_S$ of the support profile S is not more than twice the height $h_R$ of the rib; in another embodiment, it is exactly once the height of the rib. The geometry of the support profile can be such that it can perform further functions, for example as a fastening element. In that case, the support profile is a semi-finished product having properties which go beyond the simple reinforcing function. The support profile can likewise be so arranged that a non-positively and/or positively locking connection with at least one further structural member extends over the structure of the support profile.

The ratio of the height $h_R$ of the rib to the width b of the plastics base body (G) is generally at least 1:10, preferably 1:15 and particularly preferably 1:30.

According to the invention, at least one wide side face of the support profile is adhesively bonded to a rib. The narrow side face $S_W$ of the profile that faces away from the plastics base body is either also embedded in the rib or is free. The narrow side face $S_R$ of the support profile that faces the plastics base body can either be positioned thereon or be positioned at a slight distance $h_R$ from the base body G, which distance can be up to 0.5 times the height of the rib. These two embodiments are shown by way of example for an I-shaped profile in FIG. 4a (positioned directly thereon) and FIG. 4b (at a slight distance). According to the invention, the support profile S is joined to precisely one of the above-described plastics structural members K (containing a plastics base body G having the width b, and the rib structure R). The wide side face of the profile and the face of the plastics base body are accordingly perpendicular or approximately perpendicular (at an angle of about 70-110° relative to one another.

The support profile S can be made of metal, fibre-reinforced or ceramics materials. It can be produced by extrusion, pressing, deep-drawing, roll forming or other shaping processes.

The support profile is preferably produced from a metal material. In a particularly preferred embodiment, the support profile is a simple reinforcing profile made from a sheet metal, preferably from steel, iron, titanium, aluminium or magnesium or alloys of those metals. In a particularly preferred, embodiment, the support profile is a rolled steel strip or an extruded aluminium profile.

In other embodiments, the profiles can also consist of ceramics, duromers or plastics composite materials.

The structural adhesive used for the adhesive bonding can be a commercially available adhesive as is used, for example, in the automotive industry for the adhesive bonding of windscreens or sheet metal structures. It is possible to use wet adhesives, contact adhesives, hot-melt adhesives or reaction adhesives. One- or two-component polyurethane-based structural adhesives having different stiffnesses are particularly suitable for this technology. However, it is also possible to use, for example, adhesives based on acryl/acrylate, methyl methacrylate, silicone or epoxy resin. In the rib packet, the adhesive layer can have a thickness of up to several millimeters. The minimum thickness of the adhesive layer is given by demands made in terms of the flexibility of the adhesive layer and accordingly by the materials and the geometry of the composite structural members, as well as the demands made of the composite structural member. The thickness of the adhesive layer can be adjusted by different spacing between two ribs which are joined to a support profile by adhesive technology, whereby the nature and degree of the stiffening and isolation can be adjusted in a flexible manner. The adhesive can also be a thermoplastically processable hot-melt adhesive. In that case, it is possible to join the plastics material, the hot-melt adhesive and the support profile to the composite structural member in a multi-component injection moulding operation.

The thickness of the adhesive layer is dependent on the loads that are to be expected. It is only indirectly dependent on or independent of the dimensions of the structural member.

In a preferred embodiment, the adhesive layer is from 0.5 to 1.0 mm thick, in a particularly preferred embodiment from 1 to 0.5 mm thick.

The adhesive, or resilient bonding material, can optionally also additionally enter into a positively locking connection. In the case of relatively small relative movements between the composite structural members, the adhesive serves as a bonding and isolating element. High loads are transmitted by the adhesive surfaces over a large, area and not punctually, so that stress, peaks and the disadvantages associated therewith do not occur in the structural member.

The invention further provides a method for the production of such a composite plastics structural member, wherein the plastics structural member containing a base body and a rib structure containing at least one rib or at least one pair of ribs is produced means of one-, two multi-component injection moulding or extrusion processes and, further, at least one face of a support profile is bonded to at least one rib face by adhesive technology. If a support profile is bonded to two adjacent ribs, it can first be inserted between the ribs and then bonded. It is equally possible first to press the adhesive between the ribs and then to insert the support profile.

Another possible method of producing such composite plastics structural members is a multi-component injection moulding process, in which the support profile is already positioned in the corresponding mould and the plastics material and the thermoplastic elastomer, which acts as the adhesive, are injected.

The composite structural member according to the invention has the advantage that very low demands are made of the geometry of the support profile. Simple reinforcing sheets can be inserted, tolerance deviations can be compensated for by the thickness of the adhesive layer. Owing to the simple geometry, there is no waste material and, owing to the vertical arrangement of the support profile and the main surface of the base body, support profile is required. This means, on the one hand, cost efficiency owing to lower material costs and lower production costs for the support profile and, on the other hand, a reduction in the weight of the finished part. With the aid of the adhesive layers, loads that occur are distributed in the plastics material over a large area and uniformly, so that stress peaks do not occur. The novel technology accordingly also enables structural members made of amorphous thermoplastics to be reinforced with metal profiles. The nature and extent of the reinforcement and isolation can be adjusted in a very flexible manner via the geometry of the ribs and the thicknesses of the adhesive layer. Vibrations and noise are suppressed by the damping properties of the adhesive layer.

The reinforced plastics structural members according to the invention can be used, for example, as structural members or components of structural members in automotive, aircraft, railway or ship building or in the production of domestic articles, appliances or electrical devices. Application examples are architectural glazing and automotive glazing, in particular roof modules such as panoramic roofs. Further possible applications are motor vehicle side panels, car seat shells and plastics structural members for furniture, such as, for example, chairs and tables.

In a preferred embodiment, the composite plastics structural members are used in the production of automotive glazing, in particular for large panoramic roof or movable opening roof systems.

For the production of automotive glazing, the support profile has wall thicknesses of preferably from 0.5 to 5 mm and particularly preferably from 0.8 to 3 mm.

The system described herein can contribute towards reducing the weight of the roof system.

In an embodiment, a structural member according to the invention produced by the two-component injection moulding process consists of a transparent component made of a transparent plastics material, for example polycarbonate, and a second component in made of a further plastics material, for example a PC blend, and contains integrally moulded pairs of ribs in the regions that are to be reinforced. The pairs of ribs can use all of the available vertical space. Following the injection moulding process, the structural members are in most cases coated with a lacquer system. Conventional lacquer systems cure under the action of heat. After or before the lacquering, the support profile is inserted between the pairs of ribs of the base body and held in position by support ribs located between the ribs. In a standard adhesive bonding process, as is used for the adhesive bonding of motor vehicle windscreens or bodywork structural members, the support profile can then be adhesively bonded to the base body. Mounting of the sliding kinematics can subsequently be carried out by means of bores already located in the support profile. In this type of process, the load is passed into the support profile and not into the thermoplastic base body.

Owing to the lower weight of the support profile located perpendicularly to the roof surface, as compared with the reinforcing metal sheets conventional hitherto, which are mounted in parallel by conventional processes, weight reductions of up to about 50% of the reinforcement can be achieved.

The system according to the invention exhibits particular flexibility under the action of heat. If the thermoplastic base body expands, a rigidly coupled reinforcing system would lead to distortion of the group of components. The very thick adhesive used here can permit a relative movement between the base body and the reinforcing profile and reduces distortion. Owing to the perpendicular position of the support profile, the great length of the adhesive bond and the preferred load transfer under shear, this system nevertheless has high overall rigidity. The rigidity can additionally be tailored further by adjustment of the adhesive thickness and the adhesive stiffness.

By means of the method according to the invention it is possible to produce composite parts which do not exhibit surface faults, which is important for "class A" requirements in particular.

The accompanying drawings are intended to explain the inventions in greater detail by means of examples, but without limiting them to these embodiments. In the drawings:

FIG. 1: shows an isometric view of a section of a composite structural member having a base body (1) which has been produced by thermoplastic injection moulding. Two parallel ribs (2) are integrally moulded perpendicular to the base body (1). The support profile (4) is inserted between the two ribs (2) and joined to the ribs (2) by means of a structural adhesive (3). In this embodiment, the ribs (2) each have the sane height. The support profile (4) in the form of an I-Shaped profile has a greater height and protrudes from between the ribs (2).

Figure 2:
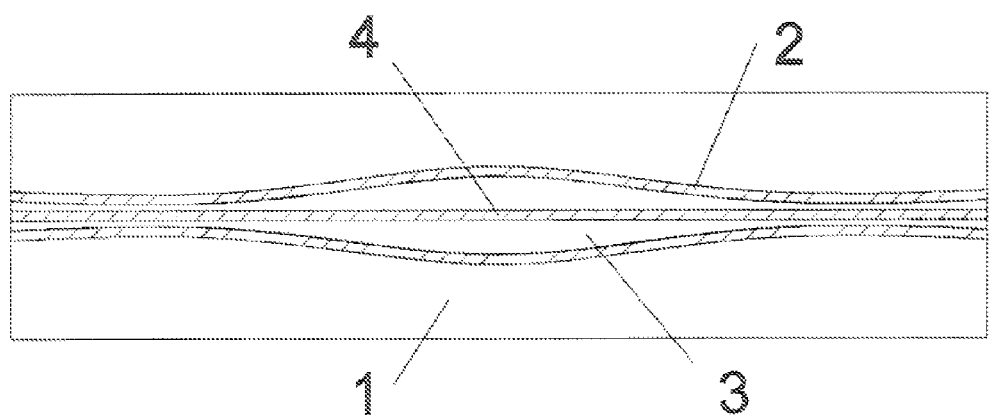

FIG. 2: shows a top view of a section of a composite structural member. The form shown here differs from FIG. 1 in that the ribs (2) do not run parallel to one another. In this embodiment, the ribs (2) run convexly relative to one another, so that the structural adhesive (3) has a thicker region in the middle.

Figure 3:
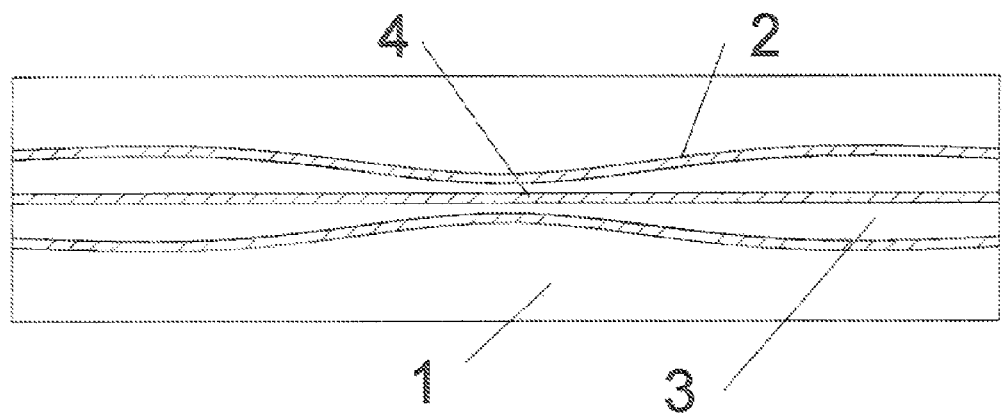

FIG. 3: shows a top view of a section of a composite structural member. The form shown here differs from FIG. 1 in that the ribs (2) do not run parallel to one another. In this embodiment, the ribs (2) run concavely relative to one another, so that the structural adhesive (3) has a thinner region in the middle.

FIG. 4a: Composite structural member of FIG. 1 in cross-section. Particularly noticeable here are the different heights of the ribs (2) and the support profile (4), which in this variant is in the form of an I-shaped profile.

FIG. 4b: Composite structural member similar to FIG. 4a, but here the I-shaped profile is positioned at a slight distance from the plastics base body.

Figure 5:
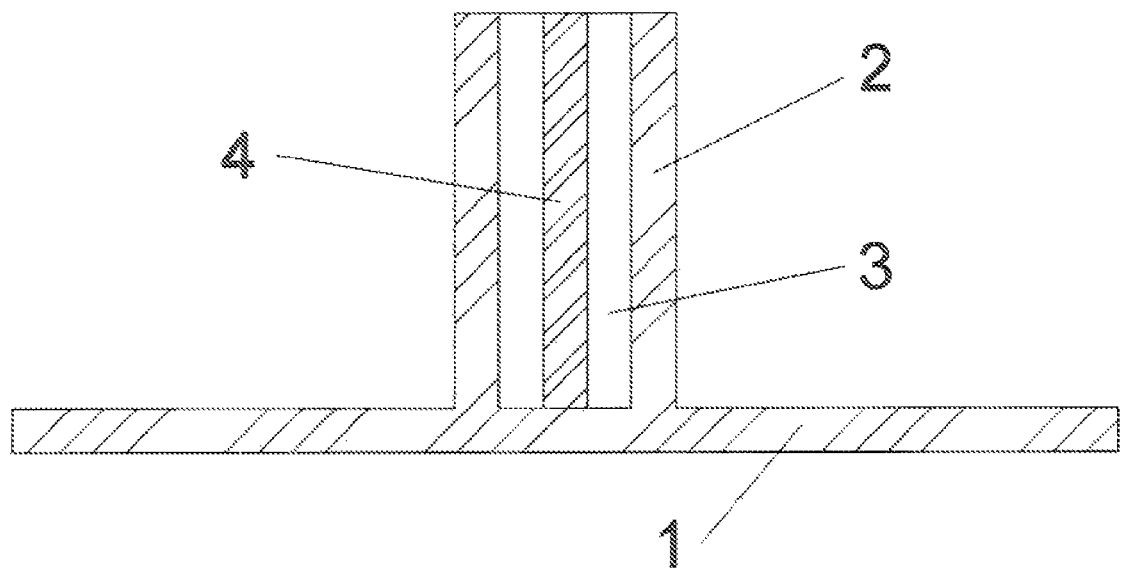

FIG. 5: Composite structural, member similar to FIG. 4 in cross-section. In this variant, both the support profile (4) and the ribs (2) have the same height.

Figure 6:
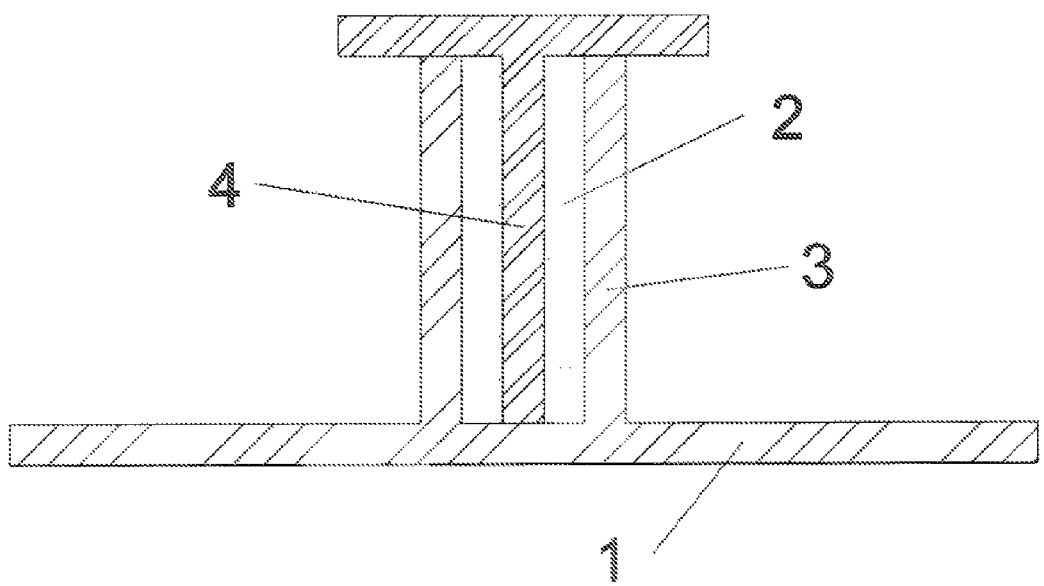

FIG. 6: Composite structural member in cross-section. In this variant, for reinforcing purposes, a support profile (4) in the form of a T-shaped profile has been bonded to the ribs (2) using a structural adhesive (3).

FIG. 7: Composite structural member in cross-section. In this variant, a hollow profile of rectangular cross-section has been used as the support profile (4). The channel, which is closed to the sides, can be used to accommodate cables or hoses or to carry media such as, for example, gases or fluids.

The invention is explained in greater detail hereinbelow with reference to a further exemplary embodiment in which the production of a roof module according to the invention from the composite structural member according to the invention is described.

In this exemplary embodiment, the structural member according to the invention, produced by the two-component injection moulding process, consists of a transparent component containing a transparent plastics material, in this example polycarbonate. The second component consists of a further plastics material, in this example a polycarbonate blend. The two-component injection moulding described here is carried out on a suitable injection moulding machine equipped with a turning plate tool.

In a first working step, a polycarbonate suitable for processing by injection moulding, for example. Makrolon® AG 2677, is processed by the injection compression moulding process to form a sheet having a size of 600 mm×800 mm in order to produce a structural member with low internal stress. After injection moulding of the first component having a wall thickness of 5 mm, the tool opens and rotates. The first component which has just been injection moulded remains in the cavity of the turning plate and is accordingly also rotated. In a further step, a further thermoplastic plastic is injection moulded onto the first component by means of a second injection moulding unit on the opposite side. The plastics material of the second component is black in colour and consists of a PC/ABS blend, for example Bayblend® T95MF. The second component is not injected onto the whole of the first component but only in the form of a peripheral surround, which leaves a transparent see-through region in the middle. The sheet of transparent polycarbonate and the peripheral second component, which has a width of 200 mm and a thickness of 2.5 mm, together constitute the base body G. The rib structure R is formed in the second, black-coloured component in the same injection moulding step.

The ribs have an advantageous thickness ratio relative to the base body G (second component) so that sink marks on the opposite side are avoided. The ribs have a thickness at the foot of the rib of about 2 mm and have a height of 15 mm. In this exemplary embodiment, ribs which run parallel to one another, as shown in FIG. 1, are produced.

The pairs of ribs run both forwards and backwards as well as to the right and left on the outer sides of the roof. In this exemplary embodiment, the pairs of ribs are arranged at right angles to one another but are not joined together. In other exemplary embodiments, the pairs of ribs could be joined together in the corner regions. In this exemplary embodiment, four individual support profiles are required, in the case where the pairs of ribs meet one another, it might even be possible to use only one support profile which is introduced peripherally between the ribs.

The inserted support profiles serve in the front and rear region mainly to reinforce the roof. On the right and left in the side region, the guiding kinematics of the roof is mounted on the support profile, which exhibits suitable, bores and apertures for that purpose, in order to produce a connection with the roof surround. Mounting of the sliding kinematics can subsequently be effected by means of bores already provided in the support profile. In this type of method, the load is passed into the support profile and not into the thermoplastic base body.

The spacing of the ribs (FIG. 1, numeral 3) is given by the thickness of the support profile (FIG. 1, numeral 4) and of the adhesive (FIG. 1, numeral 2) which is placed between the ribs. The thickness of the support profile—which here is an I-shaped profile made from a steel sheet—for a movable roof cover is here 1.5 mm, and the adhesive has a thickness of 3 mm on both sides. The thicknesses of the adhesive and of the support profile give a rib spacing of 7.5 mm, based on the inside faces of the ribs. Perpendicular to the ribs, small support ribs are formed by the injection moulding. These are perpendicular to the ribs and point into the spade between the ribs of the pairs of ribs. The height of the support ribs is about ⅓ of the rib height with a wall thickness of 0.5 mm. The support ribs serve to position the support profile at the time of mounting, when no adhesive has yet been introduced between the ribs.

Following the injection moulding process, the structural members are coated with a lacquer system in order to increase the scratch resistance and UV resistance of the surface. The space between the ribs remains lacquer-free. Conventional lacquer systems cure under the action of heat. After lacquering, the support profile, a steel strip having a wall thickness of 1.5 mm, is inserted between the pairs of support ribs of the base body and fixed between the pairs of support ribs. The support profile can then be adhesively bonded to the ribs by a standard adhesive bonding process as is used to bond motor vehicle windscreens or bodywork structural members. In this exemplary embodiment, the support profile is placed between the pair of and held in position by the support ribs, and a two-component polyurethane adhesive is introduced into the space that remains between the ribs and the support profile. In an alternative exemplary embodiment, the adhesive can first be introduced between the pair of ribs. Pressing of the support profile between the ribs is carried out thereafter.

This motor vehicle roof module according to the invention has a markedly reduced weight as compared with a roof module with standard reinforcement.

The invention claimed is:

1. A composite plastics structural member comprising a plastics structural member containing a flat plastics base body and additionally, on at least one side, also a rib structure which comprises at least one rib or at least one pair of ribs and which is joined by means of at least one rib surface, by an adhesive layer, to at least one profile surface of a support profile in such a manner that the narrow side of the support profile is positioned on the plastics base body or at a slight distance above the plastics base body, wherein the adhesive layer has a thickness of from 1 to 5 mm and, wherein the plastics structural member is an amorphous thermoplastic plastic.

2. The composite plastics structural member according to claim 1, wherein the support profile is joined to precisely one plastics structural member or the support profiles are joined to precisely one plastics structural member.

3. The composite plastics structural member according to claim 1, wherein the ratio of the height of the rib structure to the width, b, of the plastics base body is at least 1:10.

4. The composite plastics structural member according to claim 1, wherein the adhesive is based on one member selected from the group consisting of polyurethane, acrylate, epoxide and silicone.

5. The composite plastics element according to claim 1, wherein the support profile is a metal sheet made of a metal selected from the group consisting of steel, iron, titanium, aluminum, magnesium or an alloy containing at least one of those metals.

6. The composite plastics structural member according to claim 1, wherein the plastics structural member is one or more plastics materials selected from the group consisting of polycarbonate, copolycarbonate, copolyester carbonate, PC blends and polymethyl methacrylate.

7. The composite plastics structural member according to claim 1, wherein further support and holding elements are attached to the rib or to the pair of ribs.

8. The composite plastics structural member according to claim 1, wherein the support profile is a semi-finished product with properties extending beyond the reinforcing function.

9. The composite plastics structural member according to claim 1, wherein the support profile can additionally carry out fastening functions.

10. The composite plastics structural member according to claim 1, wherein the ratio of the height of the rib structure to the width, b, of the plastics base body is at least 1:15.

11. The composite plastics structural member according to claim 1, wherein the ratio of the height of the rib structure to the width, b, of the plastics base body is at least 1:30.

* * * * *